(12) United States Patent  (10) Patent No.: US 8,342,491 B2
Jørgensen et al.  (45) Date of Patent: Jan. 1, 2013

(54) TRANSPORT SYSTEM FOR TRANSPORTATION OF A SPAR

(75) Inventors: Henning Jørgensen, Ringkøbing (DK); Jens Jessen Hansen, Arthus N (DK)

(73) Assignee: Vestas Wind Systems A/S, Aarhus N (DK)

( * ) Notice: Subject to any disclaimer, the term of this patent is extended or adjusted under 35 U.S.C. 154(b) by 306 days.

(21) Appl. No.: 12/749,558

(22) Filed: Mar. 30, 2010

(65) Prior Publication Data
US 2010/0252977 A1 Oct. 7, 2010

Related U.S. Application Data (60) Provisional application No. 61/165,704, filed on Apr. 1, 2009.

(30) Foreign Application Priority Data

Apr. 1, 2009 (CN) .......................... 2009 1 0141907
Apr. 1, 2009 (DK) ................................. 2009 00444

(51) Int. Cl.
*B23Q 3/00* (2006.01)
*B61D 3/16* (2006.01)
*B60P 3/40* (2006.01)

(52) U.S. Cl. .................. 269/17; 410/44; 410/2

(58) Field of Classification Search .................... 269/17, 269/287; 29/407.09, 889.6, 525.01, 407.01, 29/426.1, 428; 410/44, 2
See application file for complete search history.

(56) References Cited

U.S. PATENT DOCUMENTS

| 7,303,365 | B2 * | 12/2007 | Wobben | 410/45 |
| 7,744,318 | B2 * | 6/2010 | Wobben | 410/45 |
| 7,918,633 | B2 * | 4/2011 | Llorente Gonzalez | 410/45 |
| 7,967,536 | B2 * | 6/2011 | Broderick et al. | 410/45 |
| 7,985,039 | B2 * | 7/2011 | Wobben | 410/45 |
| 8,056,203 | B2 * | 11/2011 | Madsen | 29/407.09 |
| 2004/0060839 | A1 * | 4/2004 | Hergeth | 206/386 |
| 2009/0020445 | A1 * | 1/2009 | Koike | 206/319 |
| 2009/0274529 | A1 * | 11/2009 | Broderick et al. | 410/45 |
| 2009/0304475 | A1 * | 12/2009 | Wessel et al. | 410/44 |
| 2010/0221084 | A1 * | 9/2010 | Wobben | 410/44 |
| 2011/0131785 | A1 * | 6/2011 | Madsen | 29/428 |
| 2011/0131809 | A1 * | 6/2011 | Riddell et al. | 29/888 |
| 2011/0187083 | A1 * | 8/2011 | Storgaard Pedersen | 280/638 |

FOREIGN PATENT DOCUMENTS
WO WO 2010020297 A1 * 2/2010

* cited by examiner

*Primary Examiner* — David B Thomas
(74) *Attorney, Agent, or Firm* — Wood, Herron & Evans, LLP (57) ABSTRACT

A transport system for transporting at least one blade or spar for a wind turbine. The blade or spar has a root end and a tip end. The transport system comprises a root frame structure for holding the root end and a fixation device adapted to fixate and support the blade or spar between the root end and tip end.

19 Claims, 9 Drawing Sheets

TRANSPORT SYSTEM FOR TRANSPORTATION OF A SPAR

FIELD OF THE INVENTION

This application claims priority from U.S. Provisional Patent Application Ser. No. 61/165,704 which was filed on Apr. 1, 2009; Denmark Application No. PA 2009 00444 filed Apr. 1, 2009 and Chinese Application No. 200910141907.9 filed Apr. 1, 2009, the entire contents of which are incorporated by reference.

The present invention relates to a transport system for transporting at least one blade or spar for a wind turbine. The blade or spar has a root end and a tip end. The transport system comprises a root frame structure for holding the root end and a fixation device adapted to fixate and support the blade or spar between the root end and tip end.

BACKGROUND ART

Transportation of large elements, such as rotor blades for a wind turbine, is complicated, and the wind turbines are often situated in remote areas, requiring that the rotor blades be transported by vehicle, ship, or even helicopter. Thus, each transport is expensive since the transport means must be specially built for that particular purpose.

When transporting the blades across country, the vehicle used is a truck with a truck bed in connection with an accompanying trailer. Such transports are often accompanied by a couple of additional vehicles in order to provide sufficient safety for the surrounding road users.

The transport of rotor blades is also complicated due to the long, fragile design of the blades, and the tip of the blade is thus often fastened on the accompanying trailer. In order for the truck to turn, the blade is rotated on the truck bed and the trailer, and thus each blade must be transported by its own vehicle.

The rotor blades are often made from a spar which is arranged in a mould. Subsequently, the final rotor blade is moulded around the spar.

Handling of the intermediate product, the spar, and the final product, the rotor blade, at the manufacturing plant is also very complicated.

SUMMARY OF THE INVENTION

An object of the present invention is, at least partly, to overcome the above disadvantages and drawbacks of the prior art and to provide an improved transport system enabling blades or spars for a wind turbine to be transported inside or outside the manufacturing site in an easy manner.

The above objects, together with numerous other objects, advantages, and features, which will become evident from the below description, are accomplished by a solution in accordance with the present invention by a transport system for transporting at least one blade or spar for a wind turbine, the blade or spar having a root end and a tip end and the transport system comprising:

a root frame structure for holding the root end, and a fixation device adapted to fixate and support the blade or spar between the root end and the tip end, wherein the fixation device has at least one rolling means, such as a wheel.

By providing the fixation device with at least one wheel, it is enabled that a transport unit, such as a tractor or a truck, can easily move one blade or spar by lifting the root frame structure and roll the blade or spar to a new location.

In one embodiment, the root frame structure may comprise a root support means, such as a projecting flange or a seat, for receiving the root end.

When the root frame structure is equipped with a root support means, the root end may easily be positioned in the root frame structure.

In addition, the fixation device may comprise at least one device fixation means for receiving the blade or spar, the device fixation means having a configuration which conforms to an outside shape of the blade and/or the spar.

By having a device fixation means which conforms to the outside of the blade or spar, the blade or spar may be fixated sideways in the horizontal plane of the transport system.

Moreover, the device fixation means may have a padding means for abutting the outside of the blade or spar.

When the fixation device is provided with padding means, the outside of the blade or spar is not scratched when arranged in the fixation device.

In one embodiment, the device fixation means may comprise a hose clamp.

In another embodiment, the device fixation means may have a first and a second part, the first part being hingedly connected to the second part.

Due to the hinged connection between the first and the second part, the blade or spar may easily be placed in the fixation means.

In addition, the transport system may further comprise a main frame structure to which the root frame structure is connectable.

The root frame structure can thus be connected to the main frame structure already placed in a new location, making it possible to use the transportation unit for other purposes.

Moreover, the fixation device may have device connection means for connecting to a second fixation device so that one fixation device can be stacked on top of another.

It is hereby possible to stack one fixation device onto another fixation device. If the root frame structures are arranged in the main frame structure or stacked onto each other, it is also easy to move several blades or spar simultaneously using the wheel of the lowest fixation device and lifting in the main frame structure.

In one embodiment, the main frame structure may have main frame support means for supporting two or more root frame structures.

Several blades or spars can thus be placed in the same main frame structure. When several root frame structures are placed in a common main frame structure, all blades or spars can be moved simultaneously by lifting the main frame structure.

The main frame support means may be positioned on a first side of the main frame structure for connection to a root frame structure and a frame projecting means may be provided on a second side of the main frame structure opposite the first side, the frame projecting means projecting from the second side so that, when loaded with the root frame structure, the main frame structure maintains an upright position.

The main frame structure is thus able to stand alone without any supportive means, also when several root frame structures are loaded onto the main frame structure.

Furthermore, the main frame support means may be a crossbar on which a device projecting means of the fixation device may be supported.

When having a crossbar, the fixation device is easily arranged in the main frame structure.

The root frame structure may moreover have root frame connection means adapted to receive a second root frame structure so that one root frame structure can be stacked on top of another.

Thus, with or without a main frame structure, a second root frame structure can be stacked on top of another root frame structure.

In one embodiment, the fixation device may have at least two wheels arranged at each side of the fixation device so that the wheels project sideways from the fixation device when one fixation device is stacked on top of another.

When placing the wheels at least partly on the side of the fixation device, the wheels do not hinder that fixation devices may be stacked on top of each other, and the wheels moreover do not increase the stacking height.

In addition, the transport system may comprise a base frame structure for receiving at least one fixation device.

Thus, the fixation devices may be secured in the base frame structure.

The invention further relates to a transport arrangement comprising two transport systems as described above, wherein the fixation devices are stacked one on top of another and are arranged in the same base frame structure so that the blades or spars attached to the first transport system lie in the opposite direction of the blades or spars attached to the second transport system.

In such a transport arrangement, two sets of blades or spars overlap each other so that the tip of one blade or spar from one set of blades or spars is positioned in between two roots of blades or spars from the second set of blades or spars, the blades or spars of each of the sets being arranged one on top of another.

Moreover, the invention relates to a mounting method for mounting of one or more blades or spars for a wind turbine before transport, the blade or spar having a root end and a tip end and the method comprising the steps of:

fastening a root end of a first blade or spar onto a root frame structure as described above, and placing the first blade or spar in a fixation device as described above.

In one embodiment, the mounting method may comprise the additional steps of:

fastening a second root end of a second blade or spar onto a second root frame structure, placing the second blade or spar in a second fixation device, connecting the first root frame structure to a main frame structure, arranging the second fixation device on top of the first fixation device, and arranging the second root frame structure on top of the first root frame structure.

BRIEF DESCRIPTION OF THE DRAWINGS

The invention and its many advantages will be described in more detail below with reference to the accompanying schematic drawings which, for the purpose of illustration, show some non-limiting embodiments and in which.

All the drawings are schematic and not necessarily to scale, and they show only those parts necessary to elucidate the invention, other parts being omitted or merely suggested.

DETAILED DESCRIPTION OF THE INVENTION

Figure 1:
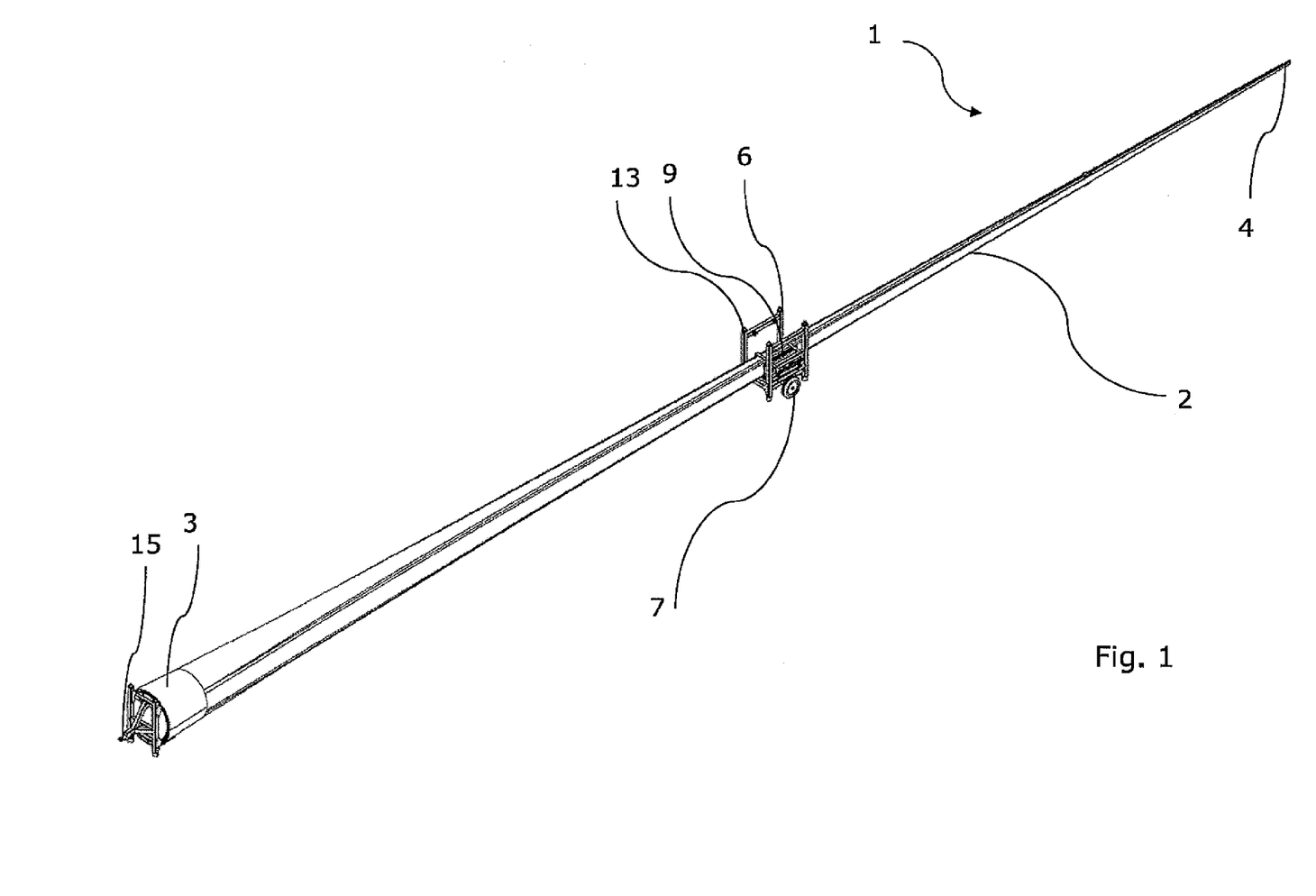
FIG. 1 shows a transport system according to the invention for transporting only one rotor blade or spar.

A transport system 1 for transporting a spar 2 for producing a rotor blade of a wind turbine is shown in FIG. 1. The transport system 1 is shown transporting a spar 2; however, the transport system could just as well be used for transporting a rotor blade. The rotor blade 2 is typically produced from a spar, which is a kind of frame structure. The spar is placed in a mould and the rotor blade 2 is moulded into its final shape around the spar. In the following, the invention will mainly be described in relation to a spar 2, even though it might just as well be used for a rotor blade.

The spar 2 has a root end 3 which is adapted to be mounted in the hub of the wind turbine when the spar has been made into a rotor blade. The other end 4 of the spar 2 is a tip and the spar tapers from the root end 3 into the tip.

Figure 2:
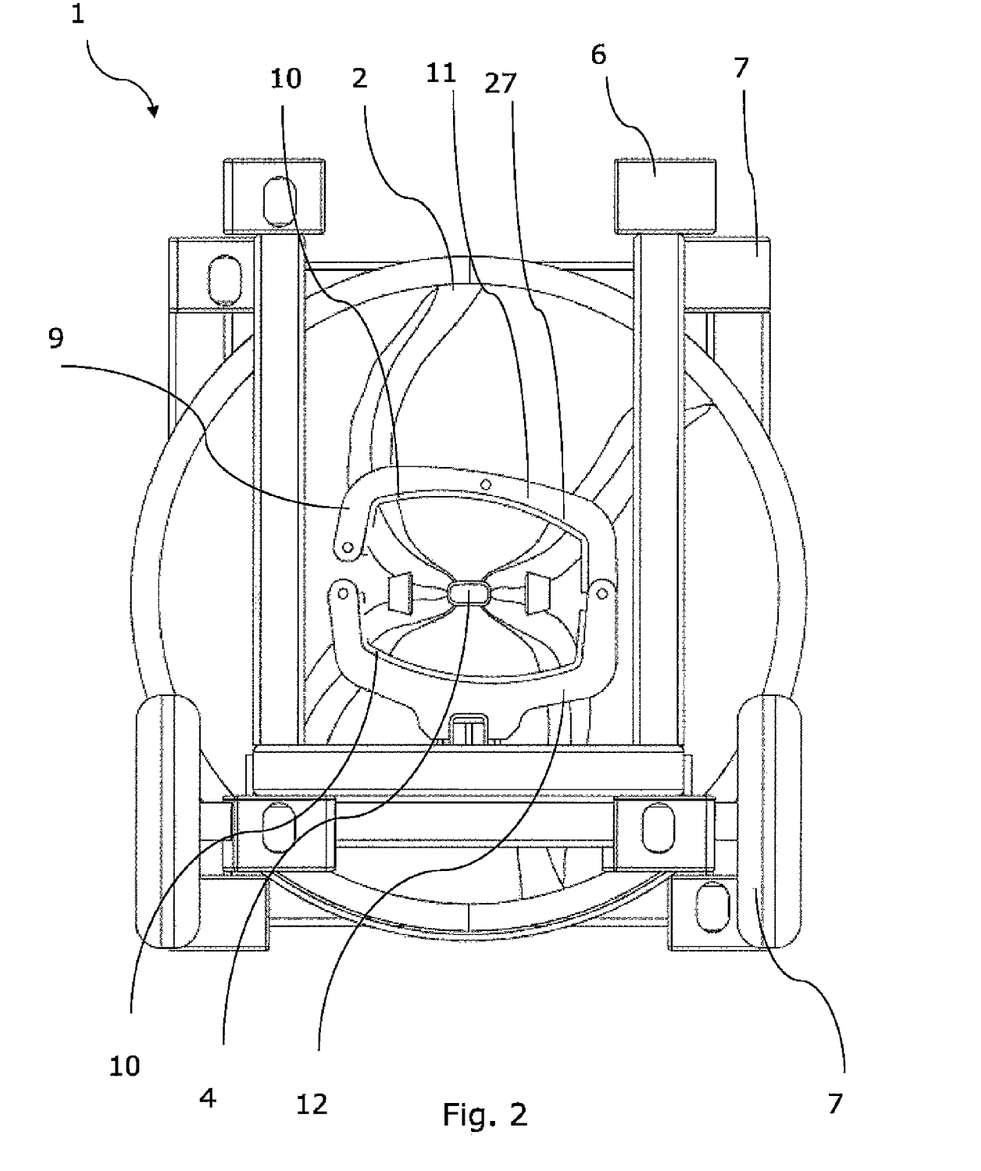
FIG. 2 shows the transport system of FIG. 1 seen from the tip end of the rotor blade or spar.
Figures 3A, 3B:
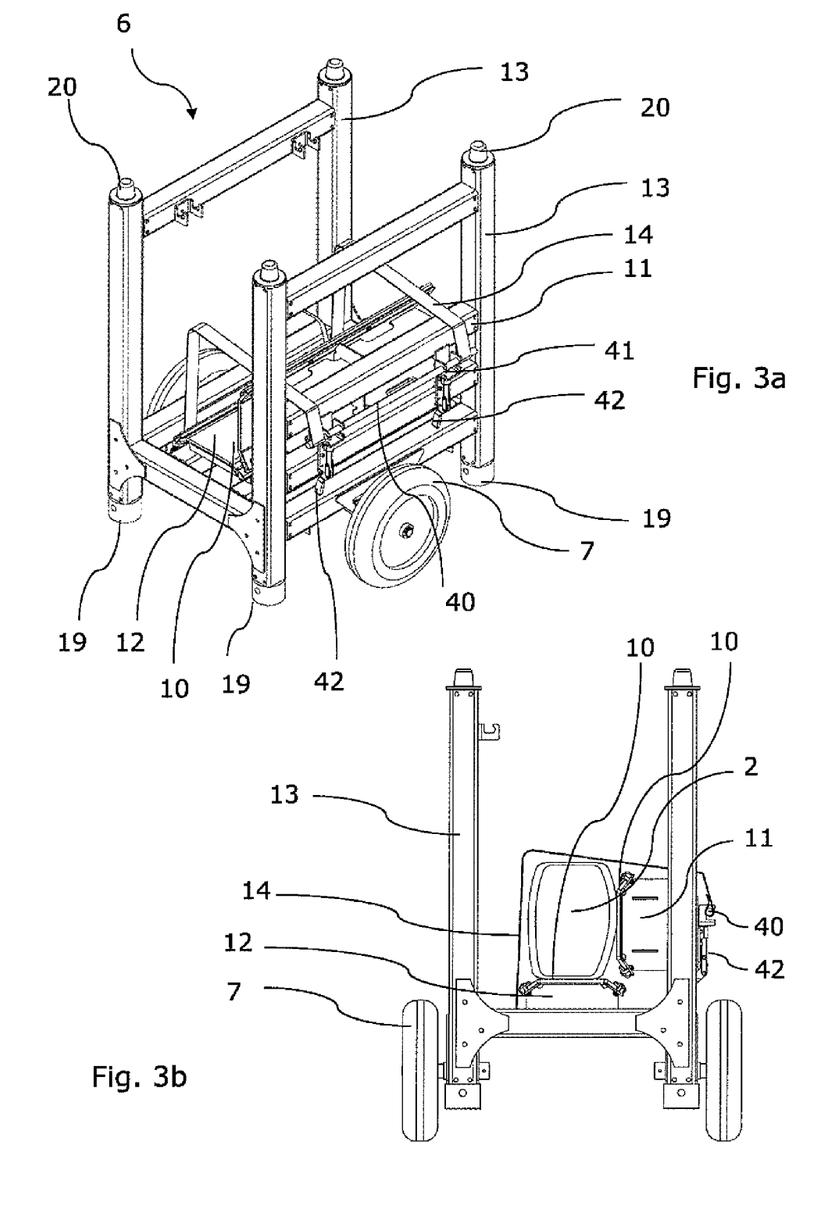
FIG. 3a shows a fixation device in perspective.
FIG. 3b shows the fixation device of FIG. 3a seen from the front.

The transport system 1 comprises a root frame structure 5 supporting the root end 3 of the spar 2. The transport system further comprises a fixation device 6 which is adapted to fixate and support the spar 2 between the root end 3 and tip end 4. As shown in FIGS. 1-3, the fixation device 6 has two rolling means, such as wheels 7 arranged on a shaft extending underneath the fixation device, the wheels being arranged in each end of the shaft so that wheels are situated at each side of the fixation device.

By equipping the fixation device 6 with wheels 7, it becomes easy to move the spar 2 or rotor blade from one place to another at the manufacturing site or at the installation site where the wind turbine is to be installed. A transport unit, such as a tractor, a pallet jack, or a pallet truck, can easily move the spar 2 or rotor blade by first lifting and then pushing and/or dragging the root frame structure 5.

The spar 2 mounted in the fixation device 6 and the root frame structure 5 is in FIG. 1 shown in perspective and in FIG. 2 from the tip 4 end of the spar. The fixation device 6 is arranged between the tip 4 and root end 3 of the spar 2. The position of the fixation device 6 along the spar 2 may be varied. When lifting up the root frame structure 5, the tip 4 of the spar 2 comes closer to the ground, and the fixation device 6 has to be arranged at a position along the spar so that the tip does not hit the ground when the root frame structure is lifted.

As can be seen from FIGS. 1 and 2, the fixation device 6 comprises an open frame structure having a base structure and two sides 13 enabling the spar 2 to enter between the sides of the frame and into a device fixation means 9.

In FIG. 2, the device fixation means comprises a lower 12 and an upper 11 part. The lower part 12 is hingedly connected to the upper part 11 of the device fixation means and the upper part is arranged in an upright position when the spar 2 is to be fixated in the fixation device 6. Subsequently, the upper part 11 is closed as a lid onto the lower part 12 or the spar 2.

The position of the fixation device 6 along the spar 2 is thus also determined by the dimensions of the clamp and the spar, respectively. The clamp 9 has a padding means 10 along its inner face 27 to protect the spar 2 during transport.

In one embodiment, the device fixation means 9 is a fixed clamp into which the spar has to enter from the side of the clamp. The tip of the spar 2 enters the clamp first, after which the spar is pushed into the clamp until the spar has a diameter too large to enter the clamp. The clamp 9 may have padding means 10 along its inner face to protect the spar 2 during transport.

In FIGS. 3a and 3b, the device fixation means 9 comprises an upper 11 and a lower part 12. When the spar is positioned in the device fixation means, the spar is positioned on the lower part 12 and the upper part 11 is subsequently placed on top of the spar. Subsequently, the upper part 11 is fastened on one side of the spar 2 by a hose clamp 14 or a fastening means, such as a nylon belt. Thus, the hose clamps or fastening means are part of the device fixation means 9 and are fastened to a rod 40 which is fastened in hook means 41. Two bolts 42 are arranged to block the exit of the rod 40 from the hook means 41. The fastening means shown in FIG. 3b are, for the purpose of illustration, not tightened around the outside of the spar. However, in reality the fastening means is tightened around the spar. The fastening means do not scratch the spar as it is usually made of nylon or the like material. If hose clamps are used, they may have some padding material on the inside towards the spar.

Both the upper 11 and lower part 12 are provided with a padding means 10 or the like resilient protection means so that the spar 2 is not scratched during transport.

As can be seen in FIG. 2, the shape of the device fixation means 9 conforms to an outside shape of the spar 2 and/or the spar; however, the device fixation means could also be in the form of two plates clamped around the spar. By having a device fixation means 9 which conforms to the outside shape of the spar 2, the spar is also fixated sideways in the horizontal plane of the transport system 1 before clamping.

Furthermore, in the embodiment shown in FIG. 2, the tip end of the spar is fixated in its recumbent position and, in the embodiment of FIGS. 3a and 3b, the tip end is fixated in its upright position.

When the fixation device 6 only has one wheel 7, the wheel is positioned under the fixation device. The fixation device 6 may also be provided with more wheels 7 than two, such as four wheels. When the fixation device 6 has four wheels 7, the wheels are arranged two and two on two separate shafts.

Figure 4:
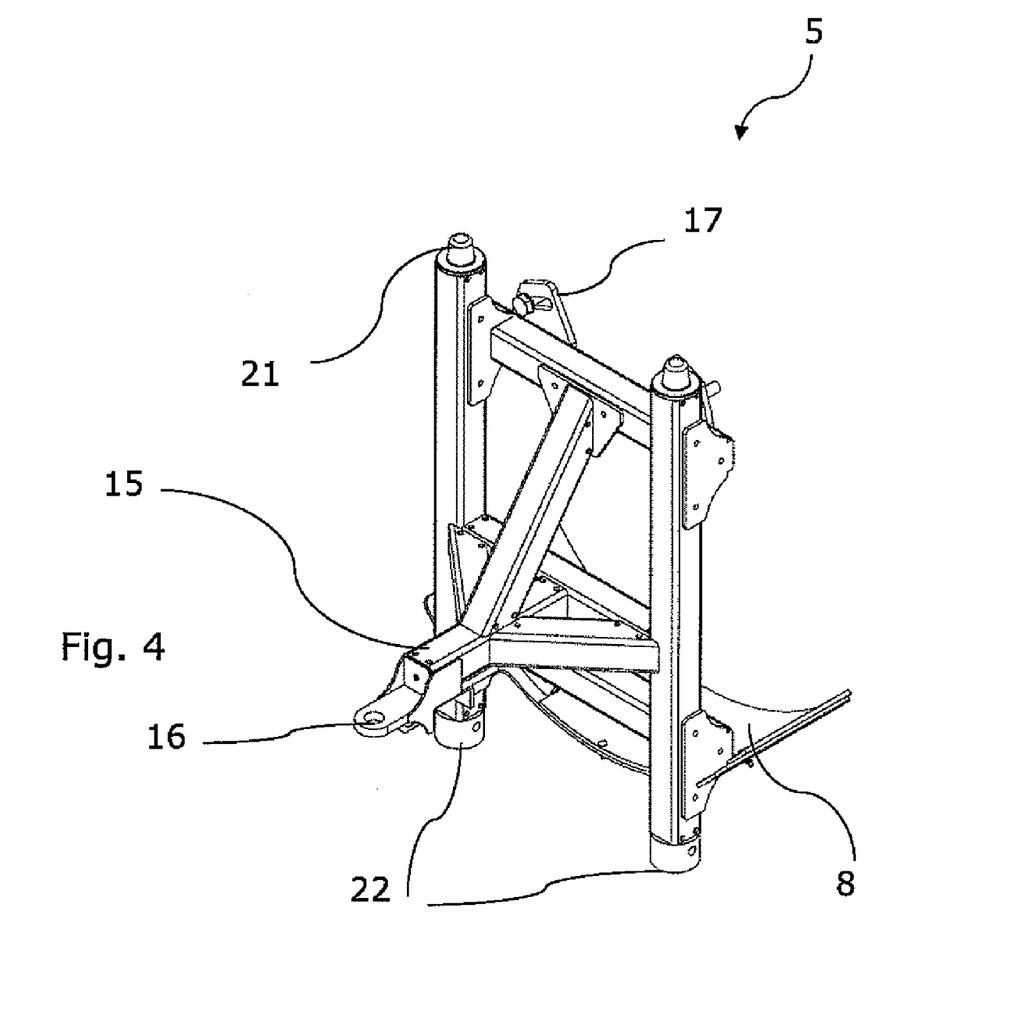
FIG. 4 shows a root frame structure.

The root frame structure 5 is a frame structure. On one side, the root frame structure 5 comprises a root support means 8, such as a projecting flange or a seat, for receiving the root end 3 as shown in FIG. 4. The spar 2 is easily positioned in the root frame structure 5 by placing the root end 3 in the seat. On the other side, the root frame structure 5 has a projecting connection part 15 having a hole 16 for connection to the transport unit, such as a tractor.

The root frame structure 5 may have other holes for fastening the root end 3 to the root frame structure. For instance, a plate 17 fastened to the root frame structure 5 may have an elongated hole through which a screw or bolt can enter in order to fasten the root 3 of the spar 2. The holes are elongated to ensure that it is always possible to penetrate both the hole in the plate 17 and a hole in the root 3 of the spar 2.

As mentioned, the spar 2 is moulded around a spar, and the transport system can also be used for transporting the spar. The root frame structure 5 is then fastened to the root end of the spar and the device fixation means 9 of the fixation device 6 is fastened around the spar between the tip and the root end. The spar is transported to the moulding site simply by lifting the root frame structure 5 and rolling the spar on the wheels 7 of the fixation device 6 to the new location. When moulding the spar 2, the spar is arranged in the mould by releasing the device fixation means 9 and arranging a belt around the spar and a wire in the hole 16 of the projecting part 15 in order to lift the spar into the mould. Thus, the root frame structure 5 follows the spar into the mould since the root of the spar is fastened in the root frame structure, which at this point is not equipped with any root support means 8, such as a seat or the like projecting flange. The seat or flange may be connected to the root frame structure 5 after the moulding process.

Thus, the root frame structure 5 follows the spar 2 from the point where the spar is only a spar to the point where the spar is to be mounted on the hub of the wind turbine at the installation site.

The fixation device 6 of FIG. 3 has device connection means in the form of projecting parts 20 and indentations 19. The projecting parts 20 are in the form of studs positioned on top of the fixation device 6 for connection to a second fixation device, and the indentations 19 are positioned in the bottom part of the fixation device for receiving the projecting parts. A second fixation device can thus be stacked on top of the first fixation device 6 during storage or transportation of the spars 2.

Just like the fixation device 6, the root frame structure 5 is provided with root frame connection means in the form of studs 21 and indentations 22. In this way, a second root frame structure can be positioned on top of the first root frame structure 5 during storage or transportation of the spars.

It is thus possible to stack spars on top of each other, and it is thus also possible to move several spars simultaneously by using the wheel 7 of the lowest fixation device 6 and lifting the lowest root frame structure 5.

When the fixation device 6 has at least two wheels 7 arranged at each side 13 of the fixation device and projecting from the side of the fixation device, it is easy to stack several fixation devices 6 on top of each other. The stacking height is not increased by the wheels 7, but is determined solely by the height of the side 13 of the fixation devices 6.

When transporting several spars from the spar manufacturing site to the moulding site which may be located at another geographic location perhaps in another country, several transport systems are stacked onto each other at a truck bed. Also, it may be needed to transport of several spars from one location to another which is easily performed by stacking the transport system onto each other on a truck bed or a ship.

At the manufacturing site, the root frame structure 5 may be placed in a main frame structure 33 for storing the spar 2 or the spar. Also, when moving the spar 2 to a new location, the root frame structure 5 can be placed in the main frame structure 33 already placed in the new location, allowing the transport unit to be used for another purpose.

The main frame structure 33 has main frame support means 18 for supporting more than one root frame structure 5 at the same time. When the main frame structure 33 holds several root frame structures 5, all spars 2 or spars can be moved simultaneously by lifting the main frame structure 33 instead of each root frame structure.

Figure 6:
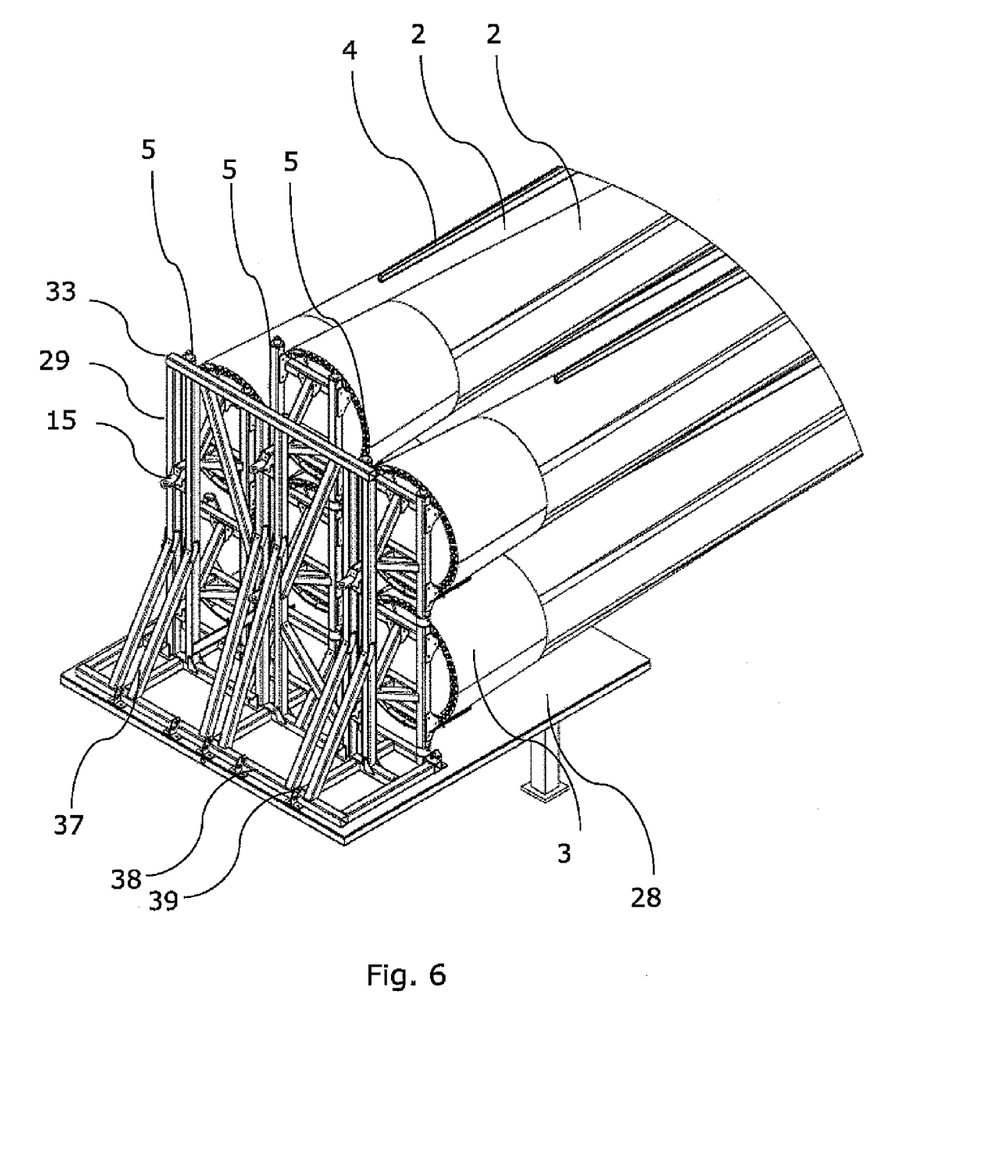
FIG. 6 shows a sectional view of the main frame structure of FIG. 5.

In order to stand alone without tilting when loaded with several root frame structures 5, the main frame structure 33 is provided with main frame support means 18 on a first side and, on a second side opposite the first side, with a frame projecting means 37. The frame projecting means projects from the second side so the main frame structure 33 may maintain an upright position when loaded with the root frame structure 5. In FIG. 6, the frame projecting means is shown as a base frame 38 extending perpendicular to the bottom of the main frame structure 33 and being linked via a support beam to the upper part of the main frame structure 33.

Figure 8:
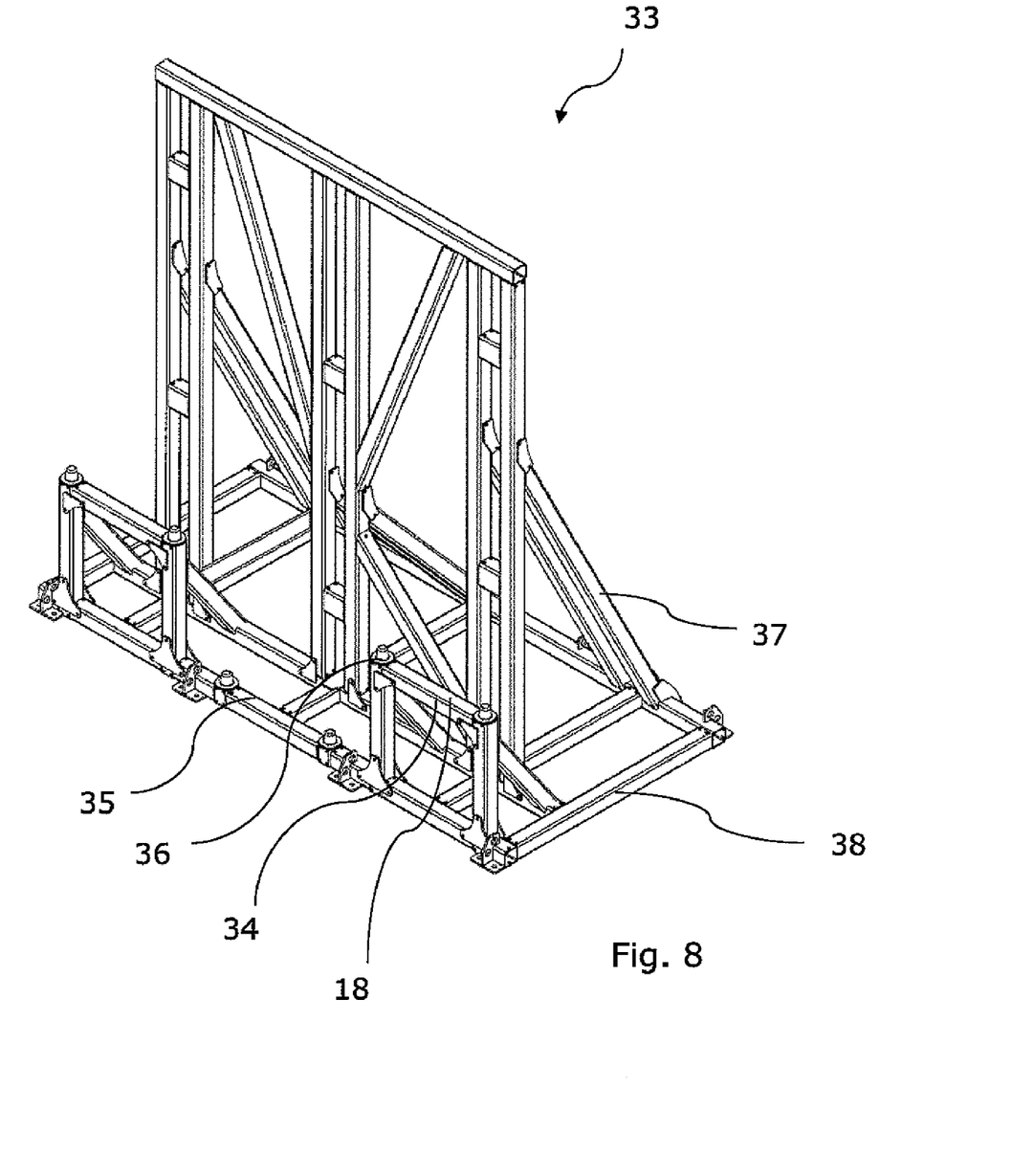
FIG. 8 shows a main frame structure according to the invention.

The main frame structure 33 has room for three rows of root frame structures 5, each row having room for two spars 2. The main frame support means 18 is in the form of a crossbar on which the first root frame structure 5 is arranged. As can be seen in FIG. 8, two crossbars 18 are arranged in a raised position and a lower crossbar is arranged between the two raised crossbars. Furthermore, each main frame support means 18 has a main frame connection means 36 in the form of a set of studs for receiving a root frame structure 5. The root frame structure 5 has indentations 22 for receiving the studs and thus fasten the root frame structure onto the main frame structure 33.

In another embodiment, the main frame structure 33 is designed with more crossbars 18 so that each root frame structure 5 is placed on a crossbar or the like main frame support means, in addition to being stacked on top of another root frame structure.

Figure 5:
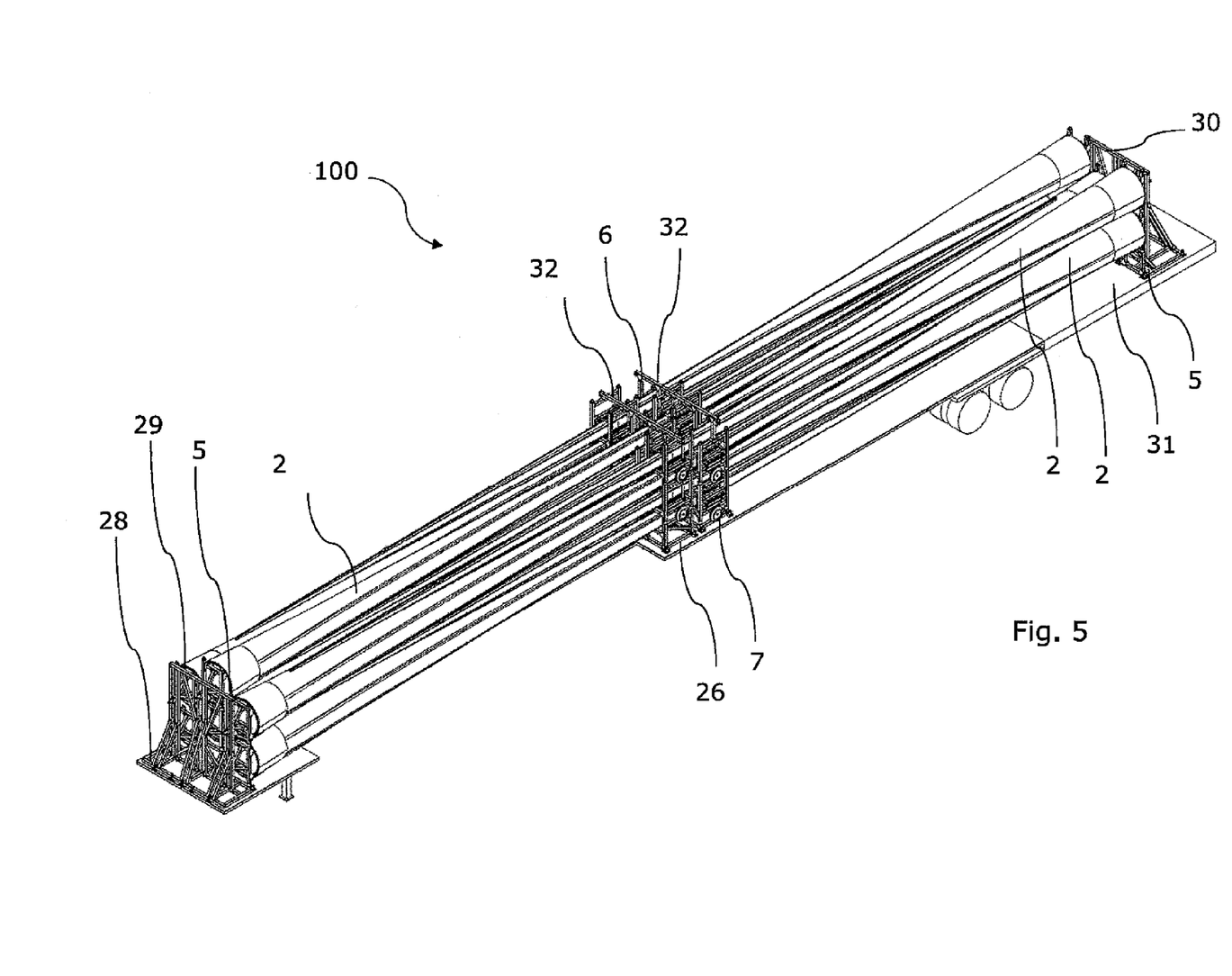
FIG. 5 shows a transport arrangement for transporting 12 rotor blades or spars.

In FIG. 5, the spars 2 are stacked one on top of another in a transport arrangement 100 comprising two transport systems 1. The transport arrangement 100 has two main frame structures, a front main frame structure 29 and a back main frame structure 30. The front main frame structure 29 is positioned on a first transport unit 28 and the back main frame structure 30 is positioned on a second transport unit 31. The first transport unit 28 is connected directly to a transport vehicle and the second transport unit 31 is a truck bed linked by the spars to be drawn after the transport vehicle. The front and the back main frame structures vary in that one has two raised main frame portions 34 and one lowered main frame portion 35 and the other one has one raised main frame portion 34 and two lowered main frame portions 35.

The transport arrangement 100 further comprises a base frame structure 26 for support and fixation of several fixation devices 6. The base frame structure 26 has a raised frame portion 23 and a lowered frame portion 24. Each frame portion has indentations 25 for fixation of the fixation devices 6. The base frame structure 26 is positioned on the truck bed 31 but may also be placed on the first transport unit if the first transport unit 28 was a truck bed.

Figure 7:
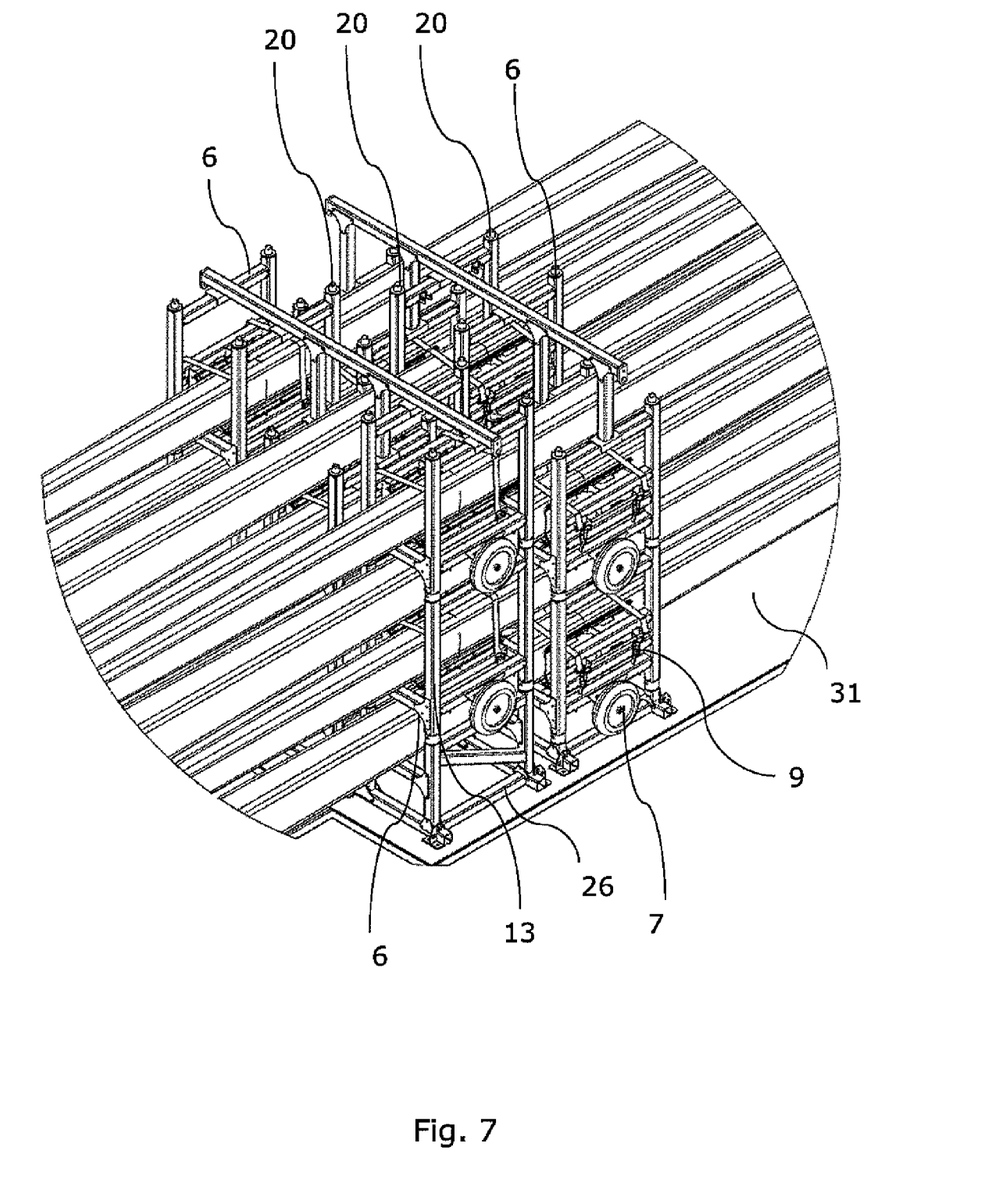
FIG. 7 shows a sectional view of the fixation devices of FIG. 5.

In the transport arrangement 100 of FIGS. 5, 6 and 7, each spar 2 is fastened in a fixation device 6 and in a root frame structure 5 and, subsequently, arranged in the base frame structure 26 and the two main frame structures 29, 30. The root frame structures 5 of the first three spars 2 are each arranged on a crossbar 18 in the first main frame structure and on the studs of the main frame structure, and the fixation devices 6 of the same first three spars are likewise arranged in the base frame structure on the frame portions 23, 24. The next three spars 3 are arranged thus that their root frame structures 5 are provided in the second main frame structure and their fixation devices 6 are arranged on top of the fixation devices of the first three spars. In this way, spars 2 can be stacked on top of each other until 12 spars are arranged in the transport arrangement 100. The tips of spars 2 arranged in the first main frame structure face the roots of spars arranged in the second main frame structure. Thus, the spars 2 overlap each other so that the room between two spars are utilised.

Figure 9:
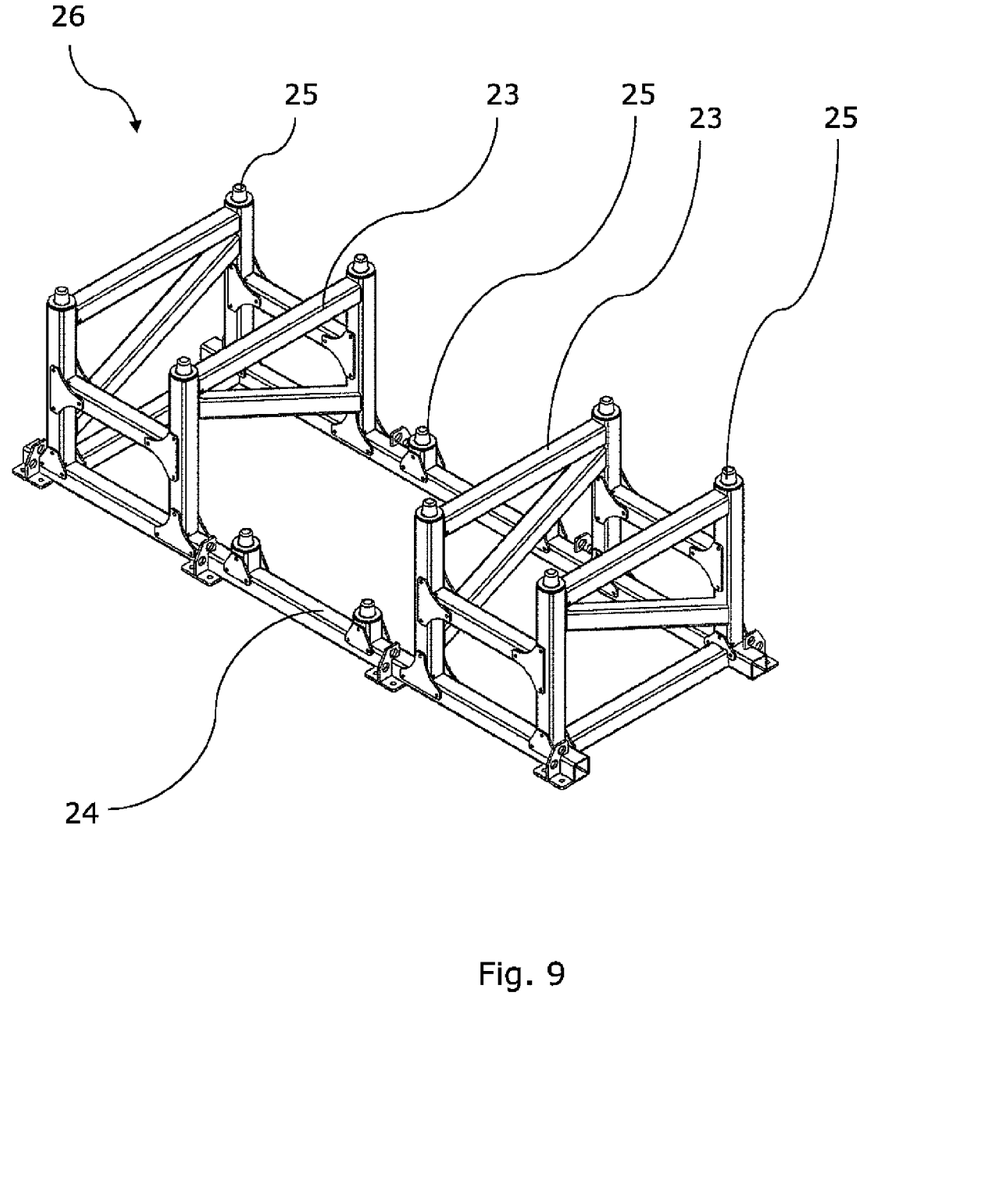
FIG. 9 shows a base frame structure according to the invention.

The base frame structure 26 is shown in FIG. 9 and has two raised portions 23 and one lowered portion 24. The base frame structure has projecting parts 25 in order to fasten in the indentations of the fixation device.

When the fixation devices 6 has been loaded onto the transport unit, a beam 32 is fastened on top of the fixation devices to link the fixation devices and provide an increased safety during transport.

Furthermore, each root frame structure 5 is fastened to the main frame structure by a fastening means, such as a typical nylon belt used in relation to trucks. The fastening means is secured into the holes of the projecting part 15 and in some fastening parts 39 on the main frame.

The transport system 1 may also comprise a base frame structure 26. The base frame structure 26 can be located at different positions at the production site and a spar 2 arranged in a root frame structure and in a fixation device can easily be moved from one base frame structure to another at the site.

Spars each arranged in a transport system and the transport systems stacked in a base frame structure can also be moved as a whole by lifting up the base frame structure and the stacked root frame structures by means of a crane.

By having a transport system, the spars or spars are easily stacked on top of each other and the transport system provides a safety distance between the spars or spars during transport. Furthermore, the transport system provides a transport solution where the several spars arranged in the transport systems can be lifted together or the spars can be lifted separately or only part of them together depending on the power of the crane present.

Before transport, the spars 2 or spars are mounted on the transport system 1 by fastening a root end 3 of a first spar or spar to a first root frame structure 5 and placing the first spar or spar in a first fixation device 6.

A second root end 3 of a second spar 2 or spar may be fastened to a second root frame structure 5, and the second spar or spar may be placed in a second fixation device 6. Subsequently, the first root frame structure 5 is connected to a main frame structure and the second fixation device is arranged onto the first fixation device. Finally, the second root frame structure 5 is arranged onto the first root frame structure.

In another embodiment, the fixation device has another kind of rolling means such as roller arranged underneath the fixation device.

By a wind turbine is meant any kind of apparatus able to convert wind power into electricity, such as a wind generator, wind power unit (WPU), or wind energy converter (WEC). And by a wind turbine nacelle 1 is meant any kind of housing housing the drive train 26 of the wind turbine, e.g. the generator, the gear, etc.

Although the invention has been described above in connection with preferred embodiments of the invention, it will be evident for a person skilled in the art that several modifications are conceivable without departing from the invention as defined by the following claims.

The invention claimed is:

1. A transport system for transporting at least one blade or spar for a wind turbine, the blade or spar having a root end and a tip end, the transport system comprising:
    a root frame structure for holding the root end, and
    a fixation device adapted to fixate and support the blade or spar between the root end and the tip end, the fixation device comprising:
        at least two rollers arranged at each side of the fixation device, and
        a device connection member for connecting the fixation device to a second fixation device so that one fixation device can be stacked on top of another fixation device, the connection member being disposed between the at least two rollers.

2. The transport system according to claim 1, wherein the root frame structure comprises a root support member for receiving the root end.

3. The transport system according to claim 1, wherein the fixation device comprises at least one device fixation member for receiving the blade or spar, the device fixation member having a configuration which conforms to an outside shape of the blade and/or the spar.

4. The transport system according to claim 3, wherein the device fixation member comprises a pad for abutting the outside of the blade or the spar.

5. The transport system according to claim 3, wherein the device fixation member comprises a hose clamp.

6. The transport system according to claim 3, wherein the device fixation member comprises a first and a second part, the first part being hingedly connected to the second part.

7. The transport system according to claim 1, further comprising a main frame structure to which the root frame structure is connectable and wherein the main frame structure has at least one main frame support for supporting two or more root frame structures.

8. The transport system according to claim 7, wherein the main frame support is positioned on a first side of the main frame structure for connection to a root frame structure and wherein a frame projecting member is provided on a second side of the main frame structure opposite the first side, the frame projecting member projecting from the second side so that, when loaded with the root frame structure, the main frame structure maintains an upright position.

9. The transport system according to claim 1, wherein the connection member has a shape conforming to the second fixation device.

10. The transport system according to claim 1, wherein the connection member is includes at least one of a projecting part and an indentation which is configured to correspond to at least one of a projecting part and indentation of the second fixation device.

11. The transport system according to claim 1, wherein the wheels project sideways from the fixation device when one fixation device is stacked on top of another.

12. The transport system according to claim 1, further comprising a base frame structure for receiving at least one fixation device.

13. A transport system for transporting at least one blade or spar for a wind turbine, the blade or spar having a root end and a tip end, the transport system comprising:
a root frame structure for holding the root end, and
a fixation device adapted to fixate and support the blade or spar between the root end and the tip end,
wherein the fixation device has at least one roller and at least one device connection member for connecting to a second fixation device so that one fixation device can be stacked on top of another fixation device, and
wherein the root frame structure has root frame connection member adapted to receive a second root frame structure so that one root frame structure can be stacked on top of another.

14. A transport system for transporting at least one blade or spar for a wind turbine, the blade or spar having a root end and a tip end, the transport system comprising:
a root frame structure for holding the root end, and
a fixation device adapted to fixate and support the blade or spar between the root end and the tip end,
wherein the fixation device has at least one roller and at least one device connection member for connecting to a second fixation device so that one fixation device can be stacked on top of another fixation device, the connection member configured such that when the fixation device is stacked on top of another fixation device, the at least one roller does not increase the stacking height.

15. A method for mounting of one or more blades or spars for a wind turbine before transport, the blade or spar having a root end and a tip end, the method comprising:
fastening a root end of a first blade or spar onto a root frame structure,
placing the first blade or spar in a fixation device,
fastening a second root end of a second blade or spar onto a second root frame structure,
placing the second blade or spar in a second fixation device,
arranging the second fixation device on top of the first fixation device, and
arranging the second root frame structure on top of the first root frame structure.

16. A transport arrangement for transporting a plurality of blades or spars for a wind turbine, the blade or spar having a root end and a tip end, the transport arrangement comprising:
a first transport system comprising a first root frame structure and a first fixation device, the first root frame structure configured to hold the root end of a first blade or spar, and the first fixation device configured to fixate and support the first blade or spar between the root end and the tip end;
a second transport system comprising a second root frame structure and a second fixation device, the second root frame structure configured to hold the root end of a second blade or spar, and the second fixation device configured to fixate and support the second blade or spar between the root end and the tip end;
a first main frame structure for supporting a plurality of root frame structures, the first main frame structure configured to receive at least the first root frame structure of the first transport system;
a second main frame structure for supporting a plurality of root frame structures, the second main frame structure configured to receive at least the second root frame structure of the second transport system;
a base frame structure disposed between first and second main frame structures for supporting a plurality of fixation devices, the base frame structure configured to receive both the first and second fixation devices, and the first and second main frame structures and the base frame structure being arranged such that the first blade or spar extends in a first direction and the second blade or spar extends in a second direction opposite to the first direction.

17. The transport arrangement of claim 16, further comprising:
a third transport system comprising a third root frame structure and a third fixation device, the third root frame structure configured to hold the root end of a third blade or spar, and the third fixation device configured to fixate and support the third blade or spar between the root end and the tip end;
a fourth transport system comprising a fourth root frame structure and a fourth fixation device, the fourth root frame structure configured to hold the root end of a fourth blade or spar, and the fourth fixation device configured to fixate and support the fourth blade or spar between the root end and the tip end,
wherein the third root frame structure is configured to be received in the first main frame structure and the first and third root frame structures include respective connection members for connecting the first and third root frame structures so that one of the root frame structures can be stacked on top of the other root frame structure, and
wherein the fourth root frame structure is configured to be received in the second main frame structure and the second and fourth root frame structures include respective connection members for connecting the second and fourth root frame structures so that one of the root frame structures can be stacked on top of the other root frame structure, and wherein the third and fourth fixation devices are configured to be received in the base frame structure.

18. The transport arrangement of claim 17, wherein the first and third fixation devices include respective connection members for connecting the first and third fixation devices so that one of the fixation devices can be stacked on top of the other fixation device, and wherein the second and fourth fixation devices include respective connection members for connecting the second and fourth fixation devices so that one of the fixation devices can be stacked on top of the other fixation device.

19. The transport arrangement of claim 18, wherein the first, second, third and fourth transport systems are arranged in the first and second main frame structures and base frame structure such that one of the second and fourth blade or spar is disposed between the first and third blade or spar in overlapping relation.

* * * * *